United States Patent
Wall et al.

(10) Patent No.: US 10,899,116 B2
(45) Date of Patent: Jan. 26, 2021

(54) PROTECTIVE COVER WITH PRESERVATIVE AGENT

(71) Applicant: 1824930 Alberta Ltd., Acheson (CA)

(72) Inventors: Wesley Wall, Edmonton (CA); Adam Wall, Acheson (CA); Shekaib Adab, Acheson (CA)

(73) Assignee: 1824930 Alberta Ltd., Acheson (CA)

( * ) Notice: Subject to any disclaimer, the term of this patent is extended or adjusted under 35 U.S.C. 154(b) by 0 days.

(21) Appl. No.: 16/027,081

(22) Filed: Jul. 3, 2018

(65) Prior Publication Data

US 2019/0030871 A1    Jan. 31, 2019

Related U.S. Application Data

(60) Provisional application No. 62/528,506, filed on Jul. 4, 2017.

(51) Int. Cl.
| | |
|---|---|
| *B32B 27/12* | (2006.01) |
| *E04H 12/04* | (2006.01) |
| *E04H 17/00* | (2006.01) |

(52) U.S. Cl.
CPC ............ *B32B 27/12* (2013.01); *E04H 12/04* (2013.01); *B32B 2307/71* (2013.01); *E04H 2017/006* (2013.01)

(58) Field of Classification Search
CPC .............................. E04H 12/2292; E04H 12/04
USPC ............................................ 52/835, 244, 301
See application file for complete search history.

(56) References Cited

U.S. PATENT DOCUMENTS

| | | | | | |
|---|---|---|---|---|---|
| 1,707,397 | A | * | 4/1929 | Hurst | E04H 17/20 52/127.5 |
| 1,981,664 | A | * | 11/1934 | Quarles | B27K 3/14 52/517 |
| 2,109,508 | A | * | 3/1938 | Schmittutz | B27K 3/14 52/741.14 |
| 2,139,422 | A | * | 12/1938 | Schmittutz | E04H 12/2292 422/40 |
| 2,450,345 | A | * | 9/1948 | William | A01G 17/14 52/301 |
| 2,955,331 | A | * | 10/1960 | Nelson | B27K 3/0235 118/268 |
| 3,319,332 | A | * | 5/1967 | James | H02G 1/02 174/45 R |
| 3,352,581 | A | * | 11/1967 | Robbins | E04H 12/00 403/244 |

(Continued)

OTHER PUBLICATIONS

"Pole Topper® Pole Top Protection," © 2015-2016 Osmose Utilities Service, Inc., <http://www.osmose.com/products>, 2 pages.

*Primary Examiner* — Patrick J Maestri
*Assistant Examiner* — Joseph J. Sadlon
(74) *Attorney, Agent, or Firm* — Christensen O'Connor Johnson Kindness, PLLC

(57) ABSTRACT

A protective cover for a pole that is typically oriented vertically with a top surface at a top end of the pole and an outer surface that extends down from an outer perimeter of the top surface is provided. The protective cover has a flexible substrate with a central section that engages the top surface of the pole and an outer section that engages the outer surface of the pole. A preservative agent is carried on the central section of the flexible substrate such that the preservative agent engages the top surface of the pole when the cover is installed.

6 Claims, 2 Drawing Sheets

(56) References Cited

U.S. PATENT DOCUMENTS

| | | | | |
|---|---|---|---|---|
| 4,276,732 A * | 7/1981 | Nielsen | A01N 59/16 | 422/291 |
| 4,908,085 A * | 3/1990 | Makus | B27K 3/0235 | 156/215 |
| 5,083,408 A * | 1/1992 | Blom | B27K 3/0235 | 428/537.5 |
| 5,085,409 A * | 2/1992 | Teixeira | E04H 17/12 | 174/158 F |
| 5,138,806 A * | 8/1992 | Marx | B27K 3/0235 | 106/18.3 |
| 5,326,410 A * | 7/1994 | Boyles | B29C 65/342 | 156/188 |
| 5,997,971 A * | 12/1999 | Wall | A01N 25/34 | 206/484 |
| 6,006,479 A * | 12/1999 | Fayle | E04H 12/2292 | 52/244 |
| 6,423,251 B1 * | 7/2002 | Blount | C08G 18/3831 | 252/601 |
| 6,543,750 B1 * | 4/2003 | Calzone | E04H 17/20 | 256/1 |
| 6,602,465 B2 * | 8/2003 | Ostby | B27K 3/0264 | 422/1 |
| 6,905,109 B2 * | 6/2005 | Mills | E04H 17/1413 | 256/65.02 |
| 7,650,994 B2 * | 1/2010 | Ninomiya | A61K 9/703 | 206/438 |
| 9,540,839 B1 * | 1/2017 | Gross | E04H 12/04 | |
| 2002/0056250 A1 * | 5/2002 | Cash | E04H 12/2292 | 52/848 |
| 2002/0056251 A1 * | 5/2002 | Venegas, Jr. | E01F 15/003 | 52/834 |
| 2004/0240943 A1 * | 12/2004 | Brensinger | E02D 5/60 | 405/211 |
| 2005/0042415 A1 * | 2/2005 | Baecker | E04H 12/2292 | 428/99 |
| 2005/0102925 A1 * | 5/2005 | Boyd | E04H 12/2269 | 52/155 |
| 2006/0115616 A1 * | 6/2006 | Baecker | B32B 1/08 | 428/40.1 |
| 2006/0142402 A1 * | 6/2006 | Dunnrowicz | E04H 12/2261 | 521/56 |

* cited by examiner

PROTECTIVE COVER WITH PRESERVATIVE AGENT

TECHNICAL FIELD

This relates to a protective cover for the tops of poles such as wooden utility poles, and in particular, a protective cover that delivers a preservative agent to the pole.

BACKGROUND

As wooden poles, such as utility poles, are exposed to the elements, they are subject to degradation, primarily ultraviolet (UV) degradation, and rot or other moisture-related degradation. Osmose Utility Services (www.osmose.com) provides a pole top protector that adheres to the top of a pole to shelter the pole top from the elements.

SUMMARY

There is provided a protective cover for a pole, comprising a flexible substrate comprising a central section that is sized to engage an end surface of a pole, and an outer section that, when installed, engages the sides of the pole, and a preservative agent carried on the central section of the flexible substrate.

According to other aspects, the protective cover may comprise one or more of the following elements, alone or in combination: the flexible substrate may be an elastomeric, moisture resistant membrane and may comprise an ultraviolet protective layer; there may be a carrier that is treated with the preservative agent, where the carrier may comprise a lignocellulosic fibre pad that is treated with a metal-boron complex, and the carrier may comprise natural fibers derived from wood or non-wood sources, unprocessed natural fibers, chemically processed fibers, mechanically processed fibers, flax fibers, hemp fibers, bamboo fibers, coir fibers, sisal fibers, jute fibers, ramie fibers, recycled fibers, newsprint fibers, biologically derived scrim, synthetic scrim or combinations thereof; the preservative agent may comprise a copper-naphtenate solution, a crushed copper and boron glass, or combination thereof; and the preservative agent may be in the form of a dissolvable fibre glass pad comprising copper, boron, or combination thereof.

According to an aspect, there is provided a protective cover as described above, and a pole that is oriented vertically and comprises a top surface at a top end of the pole and an outer surface that extends down from an outer perimeter of the top surface. The pole may be a wooden pole, and the preservative agent may comprise a wood preservative.

According to another aspect, there is provided an elastomeric, moisture resistant membrane that functions as a moisture barrier and protects from ultra violet rays. The membrane may contain a treated lignocellulosic fibre pad that will deliver a metal-boron complex that will aid in preventing rot and deterioration of the wooden pole. The fibre pad may be composed of natural fibers derived from wood or non-wood sources, unprocessed natural fibers, or combinations thereof. The fibre pad may be composed of natural fibers that have been chemically processed and/or mechanically processed. The fibre pad may be selected from a group consisting of the following elements, alone or in combination: natural fibres such as flax, hemp, bamboo, coir, sisal, jute, or ramie; recycled fibers such as newsprint fibers; and a biologically derived or synthetic scrim. The fibre pad may be any shape that fits within the area of the top of wooden poles and delivers a sufficient amount of wood preservatives to the top of the pole. The wood preservative used in the fiber pad may be a copper-naphtenate solution, a crushed copper and boron glass, or a combination thereof. The wood preservative delivery system may be a copper and/or boron fibre glass pad.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
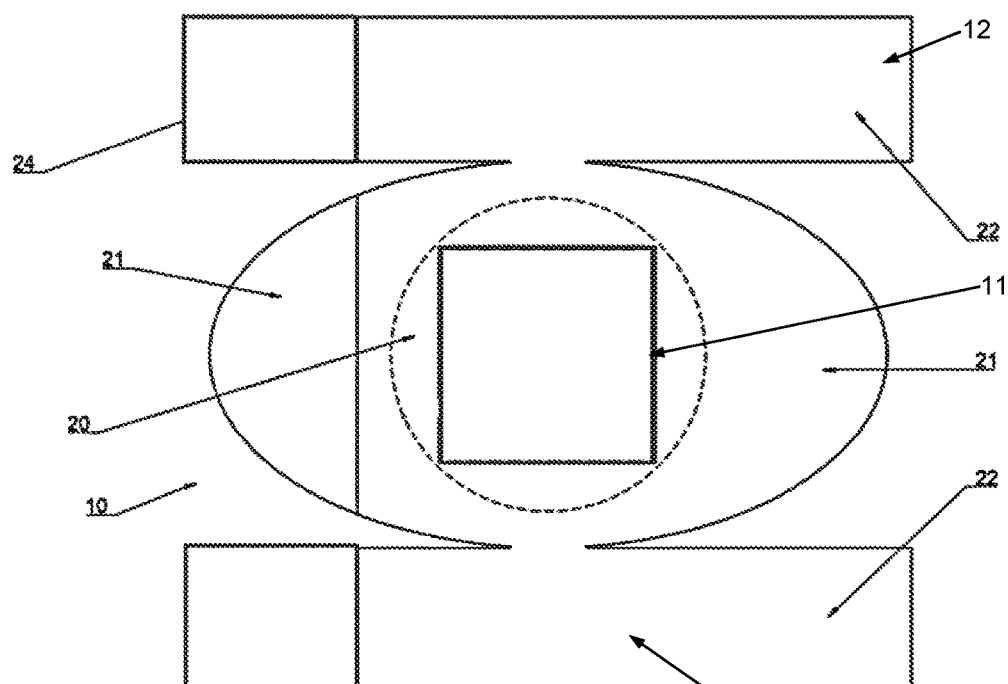
FIG. 1 is a top plan view of a protective cover.
Figure 2:
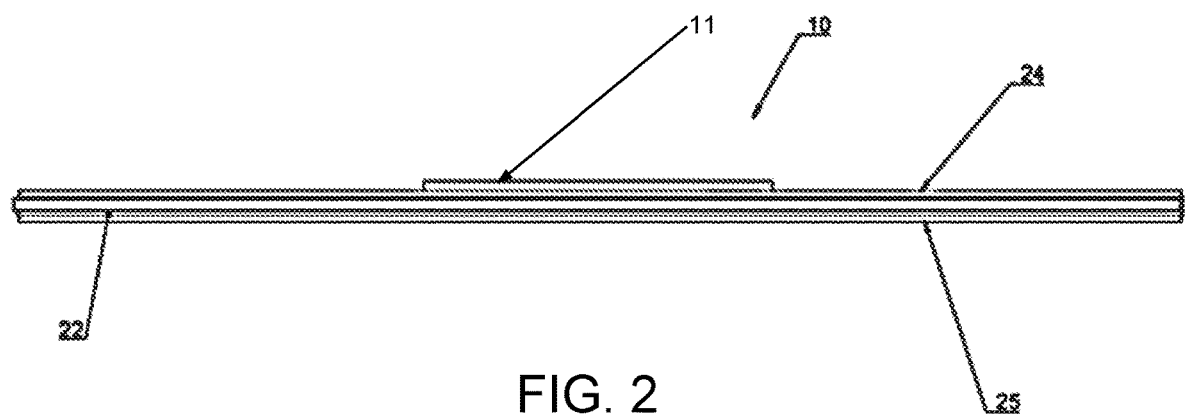
FIG. 2 is a side elevation view of a protective cover.

A protective cover, generally identified by reference numeral 10, will now be described with reference to FIGS. 1 through 4.

Figure 4:
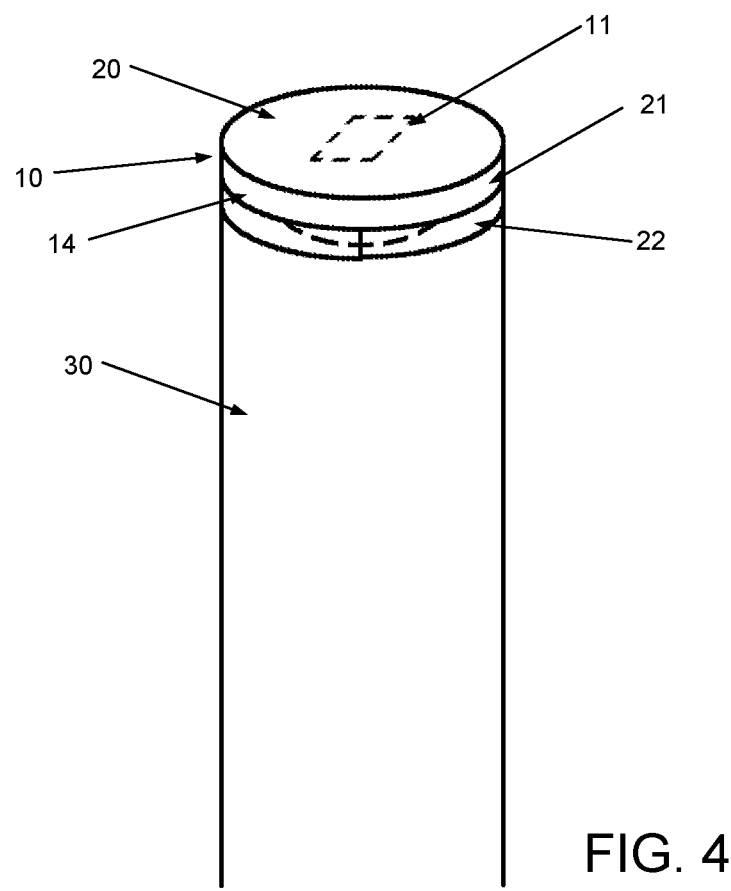
FIG. 4 is a perspective view of the protective cover installed on a pole top.

Referring to FIG. 4, there is shown generally a unit 10 that is applied to the top end of a wooden pole 30 for providing a moisture barrier by covering the upper end surface. While wooden pole 30 is shown and described, it will be understood that the device 10 may be used with various other types of poles such as pilings, fence posts, and the like. While wood is the most common material that is subject to the types of degradation that can be prevented using a cover 10, the cover 10 may also be used with poles composed of other types of material that require some protection. Although wooden poles are referred to below, it will be understood that cover 10 may also be applied to other types of poles.

Referring to FIG. 1, protective cover 10 is made from a flexible substrate 12 that has a center section 20 that is sized to cover the top of a pole 30, and an outer attachment section 14 that attaches to the sides of a pole 30. Preferably, the flexible substrate 12 is cut from a single sheet of material, although different elements may be attached or provided separately, as desired, such as if different material properties were desired for different parts of protective cover 10. As shown, the outer attachment section 14 is made up of an outer perimeter 21 of center section 20 and attachment tabs 22 that extend out from an outer edge of outer perimeter 21. Referring to FIG. 4, when installed, outer perimeter 21 and attachment tabs 22 are fold downward and overlap on the seams to protect the top of pole 30. The transition between center section 20 and the outer attachment section 14 will depend on the size of pole 30 on which protective cover 10 is installed.

Figure 3:
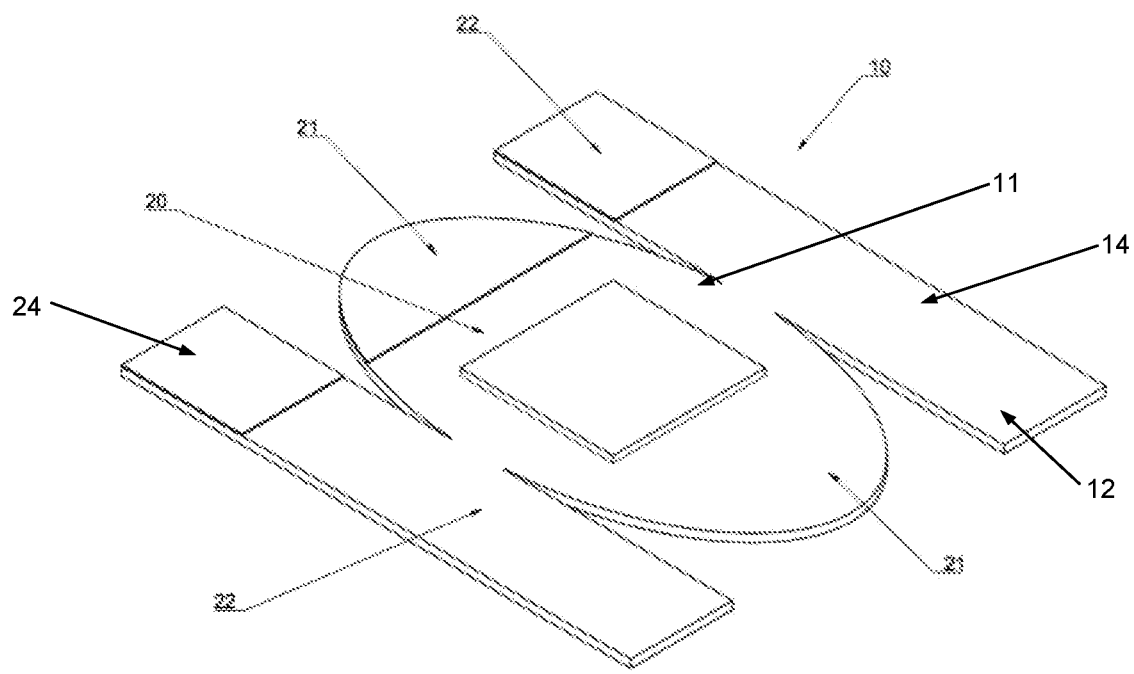
FIG. 3 is a perspective view of a protective cover.

Referring to FIG. 3, outer perimeter 21 may be integrally formed with center section 20, which allows protective cover 10 to accommodate a range of sizes and shapes of poles 30, where the delineation between center section 20 and outer perimeter 21 will be based on the actual size and shape of pole 30. For example, if protective cover 10 is designed to accommodate a range of pole sizes and shapes, center section 20 may be considered the minimum area required to accommodate the smallest size and shape of pole 30, while the outer attachment section 14 may be considered the outer reaches of substrate 12 that will fold over and engage the sides of the pole 30 given the largest shape and size of pole 30. As will be understood, these considerations may lead to the identification of a transition space between center section 20 and the outer attachment section 14, which may engage either the top of the pole 30, or the sides of the pole 30, given different sizes of pole 30.

Referring to FIG. 1, attachment tabs 22 may be two rectangular attachment sections 22 that are provided on opposite sides of central portion 20, and wrap around the sides of pole 30. Preferably, attachment tabs 22 are long enough to provide a desirable amount of overlap with each other once installed, and also overlap at least a portion of outer perimeter 21. Attachment tabs 22 and are also sized to accommodate a range of sizes of poles 30, as is the case with outer perimeter 21. It will be understood that there may be more than two attachment tabs 22, or a single long tab, as desired in a given situation. However, providing two tabs 22 may allow cover 10 to be relatively easy to manufacture while providing an integral connection from center section 20 to outer perimeter 21 on either side of center section 20.

As noted above, flexible substrate 12 is preferably made from an elastomeric moisture resistant material that is stretchable and flexible for ease of application, and to ensure a proper engagement with the pole. The material also preferably provides ultraviolet ray protection from the sun, and is in turn resistant to ultraviolet light degradation. To enhance this aspect, referring to FIG. 2, a thin plastic film layer 25 may be placed on the top of the device to help aid in ultraviolet ray protection and to make for ease of transportation and installation. The flexibility of the material allows for its ability to be stretched during installation in order to maximize surface area contact with pole 30 and the membrane.

Referring to FIG. 1, the center of section 20 carries a preservative agent 11. As depicted, the preservative agent 11 is an active solution of a copper-borate complex wood preservative that is carried by a pad comprised of lignocellulosic fibers. The fiber pad may be made from a variety of materials or combinations thereof, such as a combination of fibers along with tackifiers, binding agents, and dyes. The fibers may be derived from wood or non-wood sources. The fibers may have been chemically processed, mechanically processed or naturally occurring. The composition of the pad may include flax, hemp, bamboo, coir, sisal, jute, ramie, recycled fibers such as newsprint fibers, at varying load rates of each material, and may contain a biologically derived or synthetic scrim. The purpose of this treated pad is to deliver a preservative agent, such as a metal-boron complex, copper and boron, a copper-naphtenate solution, etc. that is known to act as a preservative, to the top of the pole 30 and have it diffuse along the top portion of the pole 30 whenever moisture levels within this region of the pole 30 are elevated in order to prevent rot and deterioration of pole 30. The choice of preservative agent will depend on the given material of pole 30, and the type of protection required for pole 30. The presence and delivery of the wood preserving agent improves the performance of protective cover 10 and ensures that the wood pole 30 does not rot under the covered areas. It is possible for moisture to travel upwards into the upper portion of the pole, and when it reaches the end portion, the membrane covering the top suspends that moisture within the top area of the pole. Without the preservative agent 11, such as copper-borate treated fiber pad, there is risk of rot and deterioration under the elastomeric and moisture resistant pad. The preservative agent 11 may also be a biocidal/co-biocidal wood preservative system that is in a form of a glass pad, such as fibre-glass, or may be a crushed copper and boron glass. The glass may be a dissolving glass, in which case the carrier and the agent are the same substance. The preservative agent may be a combination or a composite structure using these and other elements. The actual size and shape of the preservative agent and/or its carrier may be any suitable shape that fits within the area of the top of wooden poles without interfering with the attachment of cover 10, and that is able to deliver a sufficient amount of wood preservatives to the top of the pole.

Referring to FIG. 1, a removable cover 24, such as a single sheet of kraft paper 24, which has a waxy surface, may be placed on the surface of cover 10, including preservative agent 11, in order to cover and protect the adhesive layer. Sheet 24 may be used in packaging for ease of transportation and installation. Sheet 24 may be placed on the adhesive side of the membrane 12 for packaging and may be removed during application of the device 10 onto a pole top.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. In combination, a wooden pole and a protective cover, wherein:
   the wooden pole is oriented vertically and comprising a top surface at a top end of the wooden pole and an outer surface that extends down from an outer perimeter of the top surface; and
   the protective cover comprises:
      a flexible substrate comprising a central section that engages the top surface of the wooden pole, the central section forming a moisture barrier that covers the top surface of the wooden pole, and an outer section that engages the outer surface of the wooden pole; and
      a fiber pad positioned on the central section of the flexible substrate and in engagement with the top surface of the wooden pole, the fiber pad being formed from natural fibres and treated with a wood preservative agent, the wood preservative agent being released from the fiber pad when the wood preservative agent is in contact with water such that the wood preservative agent penetrates the top surface of the wooden pole.

2. The combination of claim 1, wherein the flexible substrate is an elastomeric, moisture resistant membrane.

3. The combination of claim 2, wherein the flexible substrate comprises an ultraviolet protective layer.

4. The combination of claim 1, wherein the fiber pad comprises a lignocellulosic fiber pad and the wood preservative agent comprises a metal-boron complex.

5. The combination of claim 1, wherein the natural fibers are selected from a group consisting of: wood, flax, hemp, bamboo, coir, sisal, jute, ramie, recycled natural fibers, biologically derived scrim fibres, or combinations thereof.

6. The combination of claim 1, wherein the wood preservative agent comprises a copper-naphtenate solution.

\* \* \* \* \*